United States Patent
Muranaka (10) Patent No.: US 7,834,860 B2
(45) Date of Patent: Nov. 16, 2010

(54) INPUT DEVICE

(75) Inventor: Tetsuo Muranaka, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 851 days.

(21) Appl. No.: 11/734,060

(22) Filed: Apr. 11, 2007

(65) Prior Publication Data

US 2007/0242053 A1    Oct. 18, 2007

(30) Foreign Application Priority Data

Apr. 14, 2006 (JP) .............................. 2006-112073

(51) Int. Cl.
*G06F 3/041* (2006.01)

(52) U.S. Cl. .................................... 345/173; 178/18.01

(58) Field of Classification Search ......... 345/173–182; 178/18.01–18.11
See application file for complete search history.

(56) References Cited

U.S. PATENT DOCUMENTS

| | | | |
|---|---|---|---|
| 4,988,837 A * | 1/1991 | Murakami et al. | 178/18.07 |
| 5,790,106 A * | 8/1998 | Hirano et al. | 345/173 |
| 7,518,381 B2 * | 4/2009 | Lamborghini et al. | 324/679 |
| 2006/0109252 A1 * | 5/2006 | Kolmykov-Zotov et al. | 345/173 |
| 2006/0146038 A1 * | 7/2006 | Park et al. | 345/173 |

* cited by examiner

*Primary Examiner*—Kevin M Nguyen
*Assistant Examiner*—Kenneth B Lee, Jr.
(74) *Attorney, Agent, or Firm*—Brinks Hofer Gilson & Lione (57) ABSTRACT

An electrostatic capacitance type input device includes a plurality of electrodes, and detects coordinate position on the basis of a variation in an electrostatic capacitance between the electrodes. The device corrects an erroneous operation in which the device is not properly operated but certain coordinate positions are continuously detected.

7 Claims, 5 Drawing Sheets

INPUT DEVICE

This application claims the benefit of priority under 35 U.S.C. §119 to Japanese Patent Application No. 2006-112073, filed Apr. 14, 2006, and hereby incorporated by reference in its entirety.

BACKGROUND

1. Field of the Invention

The present invention relates to an input device, which can detect a position close to an operator on the basis of a variation in an electrostatic field between electrodes. In particular, this invention relates to an input device adapted to update a reference value indicative of an amount of variation in the electrostatic field.

2. Description of the Related Art

Japanese reference JP-A-08-137607 described below, includes a coordinate input device of an electrostatic capacitance type having a plurality of X electrodes and Y electrodes arranged in a matrix.

In this coordinate input device, the plurality of X electrodes are arranged on a surface of a glass substrate, the plurality of Y electrodes are arranged on the other surface of the glass substrate, X electrodes and Y electrodes are disposed in the matrix through the glass substrate, and a predetermined electrostatic capacitance is formed between each of the X electrode and the Y electrode.

Through a control unit, the X electrodes are connected to a transmission circuit and a Y electrode enters an ON state such at a predetermined potential is applied on each of the X electrodes and Y electrodes. At this state, when a finger of the user touches the coordinate input device and the device is pushed, the electrostatic field between the X electrodes and Y electrodes is varied, and a voltage change due to the variation in the electrostatic field is output from each of the Y electrodes. The voltage changes output from each of the Y electrodes are read by the control unit via an A/D converting means. Voltage detection means provided in the control unit specifies a portion where the electrostatic field between X electrode and Y electrode are adjacent to each other on the basis of data outputted from the A/D converting means, thereby detecting positional information corresponding to the portion touched by the user's finger.

The input device of the electrostatic capacitance type detects the variation in the electrostatic field when the device is touched with the finger, which is similar to a conductive material. However, in order to detect the touching of the finger with high sensitivity, it is necessary to detect an extremely small variation in the electrostatic capacitance between electrodes. Because the electrostatic capacitance between electrodes subtly varies depending on changes in its environment or variations in floating capacitance, a erroneous operation may occur. In an erroneous operation, a position different from a true coordinate position of the user's finger is detected.

Therefore, the input device of the electrostatic capacitance type is generally provided with a correction function. In the correction function, for example, when it is determined that the finger approached a certain portion of the input device, and then it is determined that the finger moves away from that position, a comparison reference value is updated.

However, the correction means for updating the reference value when the finger moves away cannot correct for an erroneous operation, such as when the user's finger does not get sufficiently close to the portion of the input but the detection output indicates that the finger is close. Such the erroneous operation may be caused by an expansion and contraction of the substrate due to drastic temperature changes, or due to a deformation of the substrate due to the temperature change, or due to an external force. When the substrate is expanded or deformed, a distance between electrodes formed on the substrate is locally changes so that the electrostatic capacitance between electrodes is physically changed. In this state, when a potential is applied to the electrode, a local change in capacitance is detected, and a variation in detected values is continued for a predetermined time. At this time, an electronic circuit erroneously recognizes that a predetermined portion of the input device is operated by the finger, and thus an erroneous detection is continuously outputted.

When the input device is employed in an electronic apparatus that experiences severe temperature changes, or a linear expansion coefficient of the substrate is large, such erroneous operation may easily occur. For example, when the substrate is made of a resin sheet and is employed in a portable apparatus, and the portable apparatus is moved from an interior environment equipped with air conditioning, to a high temperature external environment, the erroneous operation may occur.

SUMMARY OF THE INVENTION

At least one object of the present invention is to provide an input device which can correct an erroneous operation when the input device is not operated but an erroneous operation is generated.

According to one embodiment, an input device includes an input unit which has a plurality of electrodes intersecting each other and insulated from each other. The device further includes a driver, which selects one electrode and applies a potential thereto, and a control unit, which acquires a detection value based on a variation in the electrostatic field between the electrodes and determines whether a detection state for detecting a certain coordinate position of the input unit is achieved based on a difference between the detection value and a reference value. The control unit updates the reference value when the detection state for detecting the same coordinate position is continued and it is determined that the difference between the detection value and the reference value is less than or equal to a predetermined update detection range.

When the detection value of the same coordinate position is continued for a predetermined time without being changed, and a variation range of the detection value based on the change of the electrostatic field at this point of time is narrow, the input device updates the reference value serving as a comparison reference of the detection value. Therefore, when such the detection state is continued, the erroneous operation, in which the device is not operated by the operator's finger, but the detection output of the predetermined coordinate position is continued, can be prevented by updating the reference value.

For example, the reference value may be updated to have the same value as the detection value. By updating the reference value to correspond to the detection value at the time of the erroneous operation, it is possible to detect whether the device is operated by the finger with a high degree of sensitivity. However, the invention is not limited to the updating of the reference value to correspond to detection value. The reference value may be updated to a value closer to the corresponding detection value, or the reference value may be updated to a value close to the detection value by previously setting a variation amount and varying the reference value by a predetermined value.

The control unit may store a predetermined detection range and may determine that the detection state is achieved when it is determined that the difference between the detection value and the preference value is greater than or equal to the predetermined detection range. The control unit may monitor the detection value every predetermined monitoring time when the detection state has been achieved, an may compare the difference between the detection value and the reference value with the predetermined update detection range when it is determined that the detection state for detecting the same coordinate position is continued for a predetermined number of monitoring times.

However, the reference value may be updated by setting a number of a repetition times of the monitoring time. The reference value may be updated be setting the determination time to compare the difference between the detection value and the reference value with the value of the update detection range when the same detection value is continued as much as the detection time.

The control unit may determine that the operator is approaching the input unit and may generate coordinate data on the basis of the detection value when determining that the difference between the detection value and the reference value is equal to or greater than the predetermined update detection range. Then reference value may be set for each electrode supplying with the potential.

The input unit may include a plurality of X electrodes and Y electrodes, which are insulated from each other and intersect each other. The detection electrodes are positioned between adjacent X electrodes or between adjacent Y electrodes, and an X driver sequentially selects and applies the potential to the X electrodes. A Y driver sequentially selects and applies the potential to the Y electrodes, and the detection unit detects a potential difference between the X electrode and the corresponding detection electrode or a potential difference between the Y electrode and the corresponding detection electrode.

However, the input unit of the invention may not include the detection electrode, and may include X electrodes formed on one surface of the substrate and Y electrodes formed on the other surface of the substrate, and may detect a variation in an electrostatic field between the X electrode and Y electrode when the X electrode is supplied with the potential. In addition, the input unit may detect a variation in an electrostatic field between the X electrode and Y electrode when the Y electrode is supplied with the potential. Alternatively, the input device may detect a variation in an electrostatic field between the X electrode and an earth electrode and a variation in an electrostatic field between the Y electrode and an earth electrode.

The invention is particularly effective in an input device which includes the X electrodes formed on one surface of the substrate made of a resin sheet, Y electrodes formed on the other surface of the substrate, and the detection electrodes formed on the one surface or the other surface of the substrate.

Since the substrate of the input unit is made of the resin sheet, it is possible to form a thin and light input device. Therefore, even when the substrate of the resin sheet is expanded and contracted due to a temperature change or is deformed due to the external force, the erroneous operation can be prevented. According to an input device of the invention, the detection reference can be corrected at a state where the device is not properly operated by the finger. Therefore, erroneous operation can be prevented.

DESCRIPTION OF THE PREFERRED EMBODIMENTS

Figure 1:
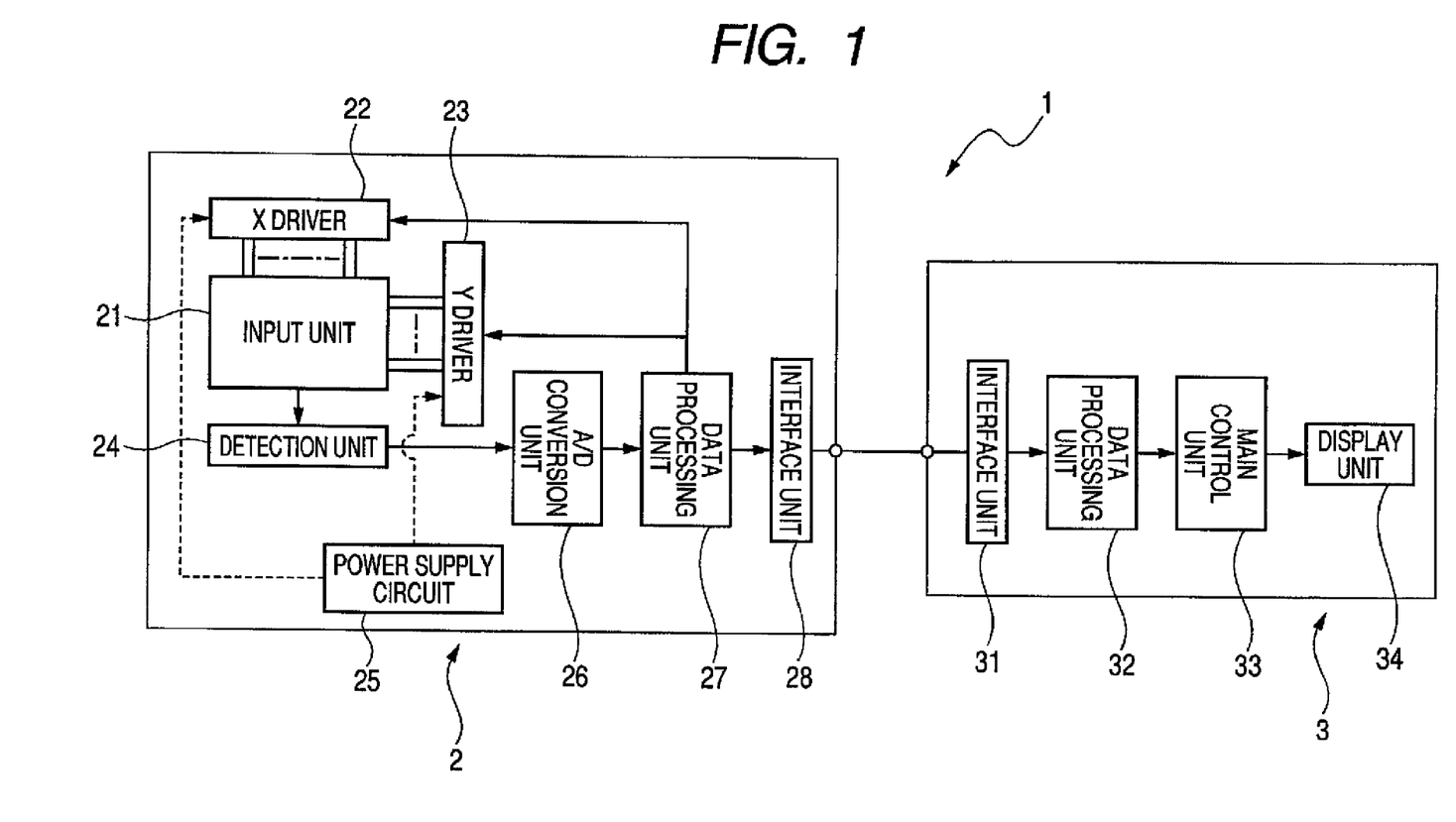
FIG. 1 is a circuit block diagram of an electronic apparatus having an input device according to an embodiment of the invention.
Figure 2:
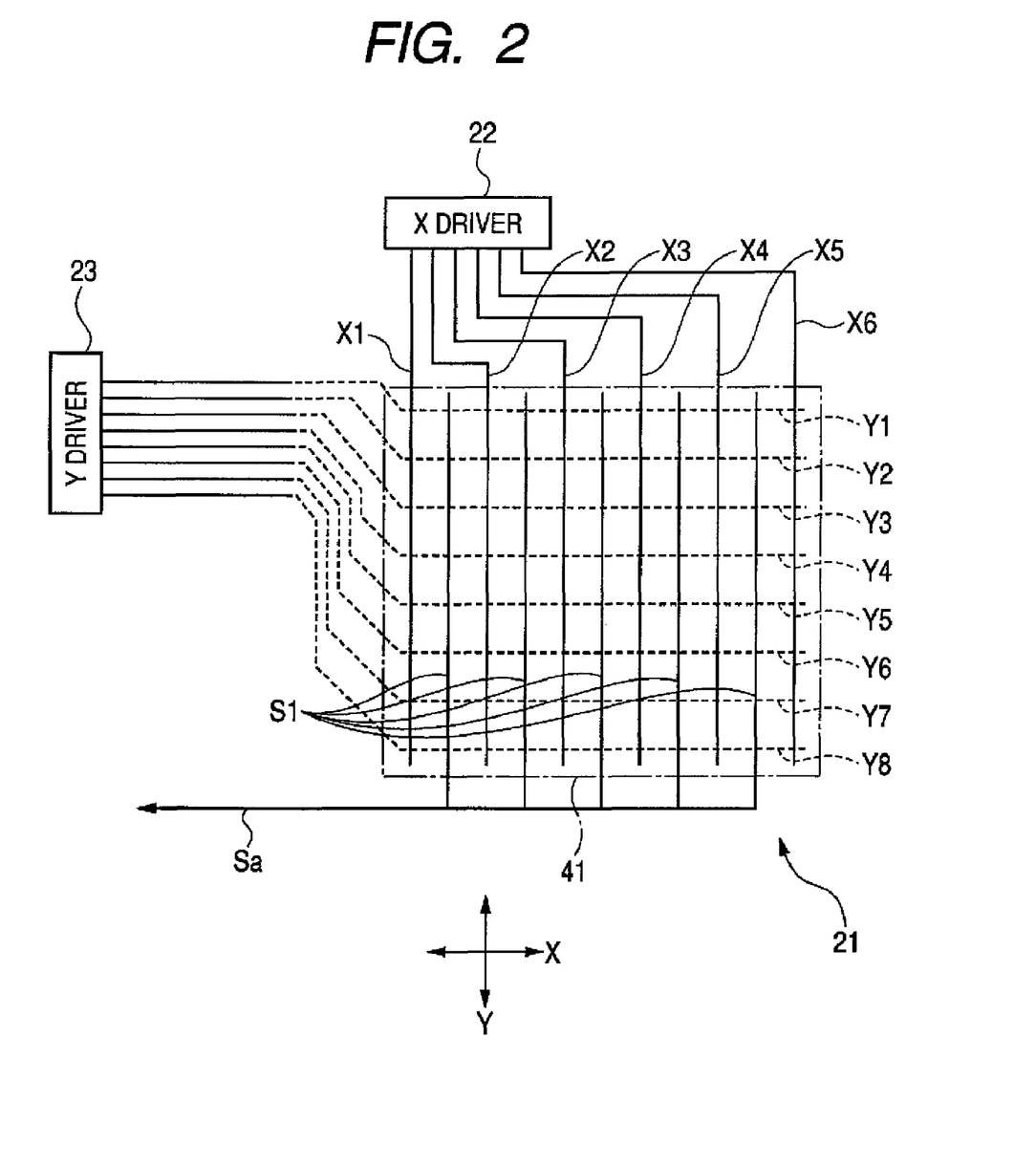
FIG. 2 is an enlarge diagram of an input unit of the input device according to the embodiment.
Figure 3:
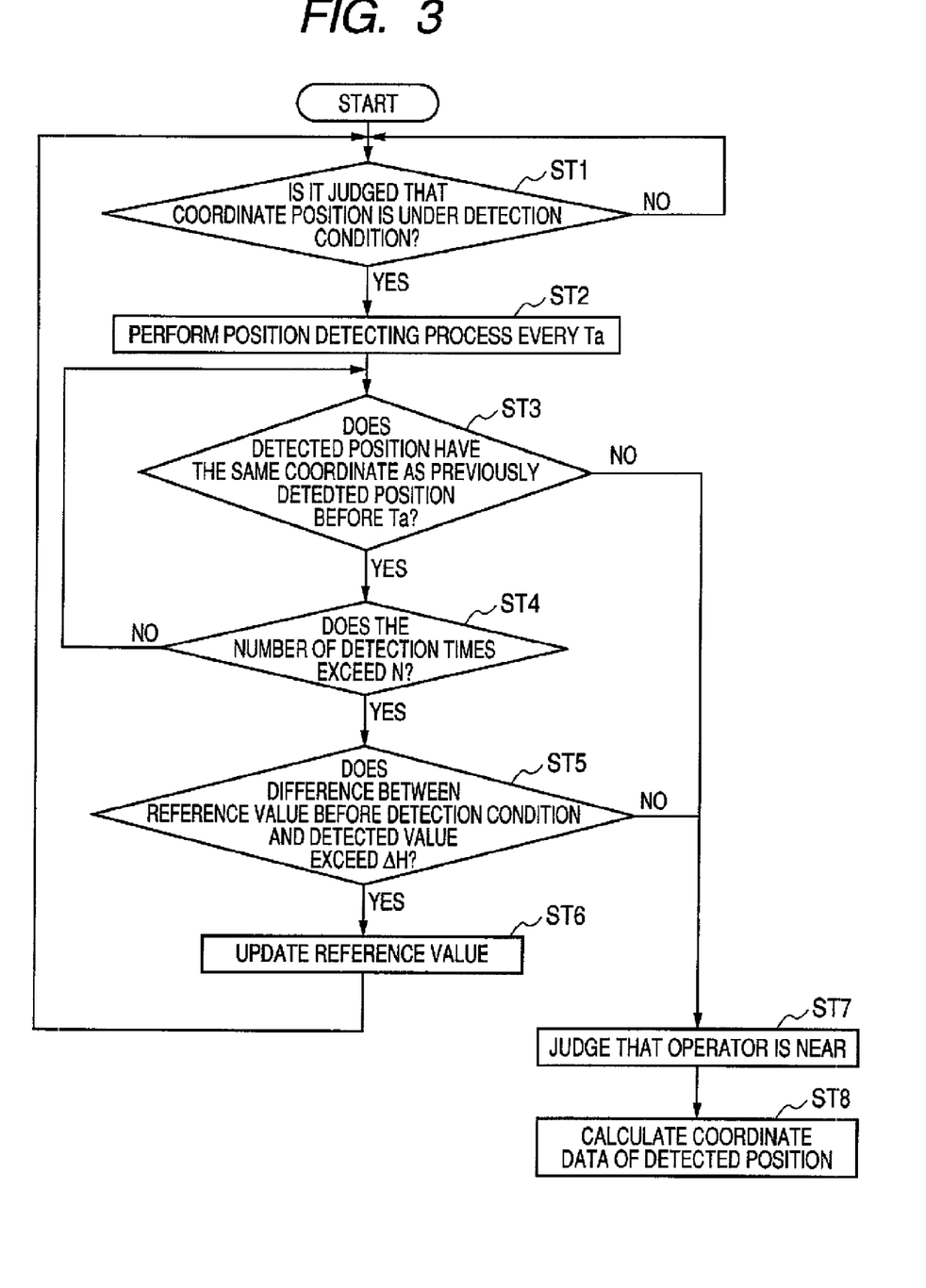
FIG. 3 is a flow chart illustrating a correction operation.
Figure 4A:
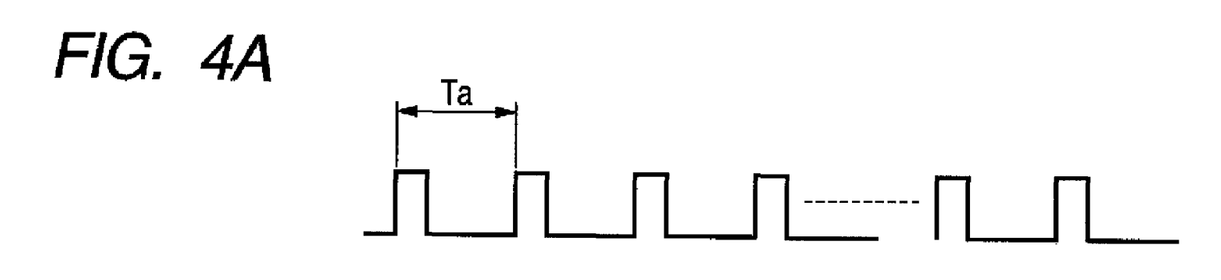
FIGS. 4A and 4B are timing diagrams illustrating a correction operation.
Figure 4B:
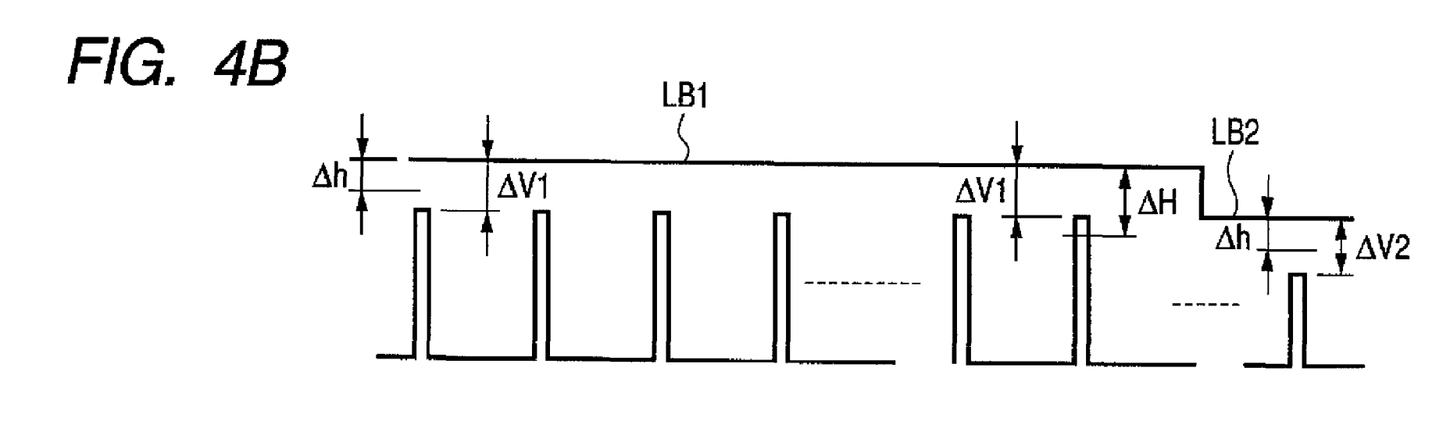
Figure 5A:
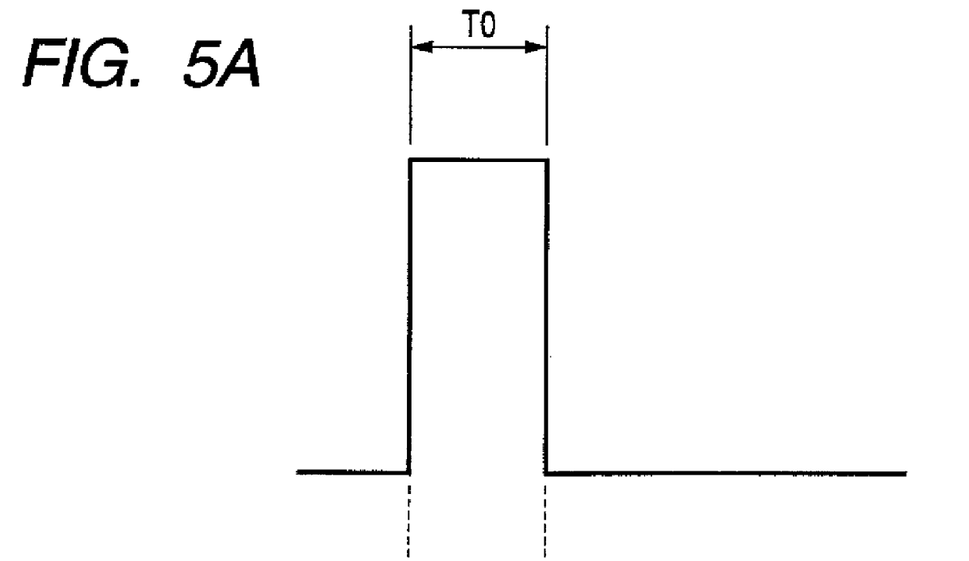
FIGS. 5A and 5B are diagrams illustrating a detection operation.
Figure 5B:
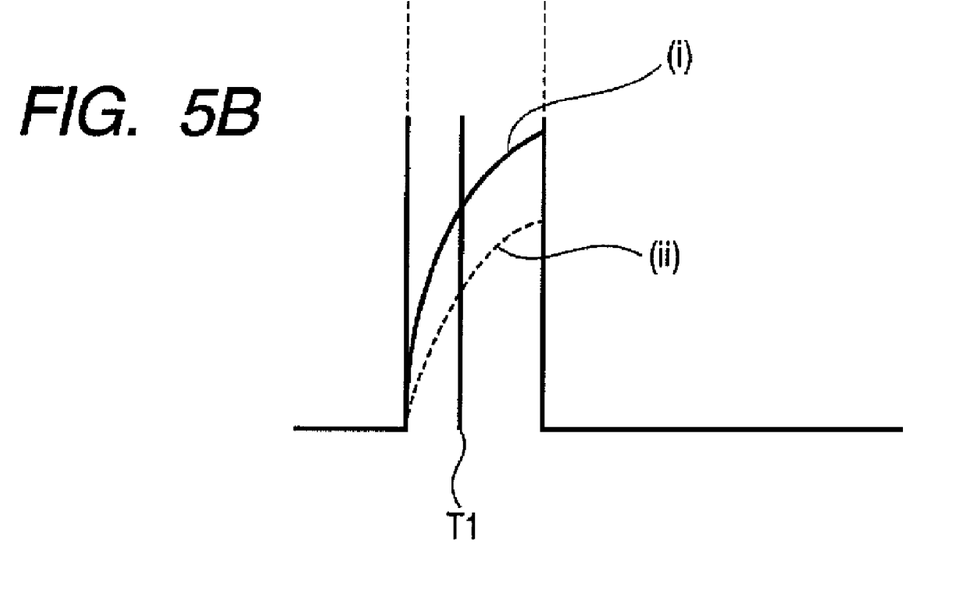

FIG. 1 is a circuit block diagram illustrating an input device and a circuit structure of an electronic apparatus equipped with the input device according to an embodiment of the invention. FIG. 2 is an enlarged diagram illustrating the structure of the input device in detail. FIG. 3 is a flow chart illustrating a correction operation. FIGS. 4A and 4B are timing diagrams illustrating a correction operation. FIGS. 5A and 5B are diagrams illustrating a detection principle of the input device.

The electronics apparatus 1 shown in FIG. 1 includes an input device 2 and a processing unit 3 supplied with a detection output when the input device 2 is operated. An example of the electronic apparatus 1 includes various kings of portable devices, such as a portable telephone, a portable game machine, and a portable acoustic instrument, or an electronic apparatus used for home or office, such as a personal computer.

The input device 2 includes an input unit 21 operated by a finger of the user or operator, which input unit 21 may be formed of a conductive material, an X driver 22, which sequentially selects and applies a potential on the X electrode formed on the input unit 21, Y driver 23, which sequentially selects and applies the potential on the Y electrode formed on the input unit 21, a detection unit 24, which detects a detection output from the detection electrode formed on the input unit 21, and a power supply circuit 25, which applies the potential on the X driver 22 and Y driver 23. In the input device 2, a detection signal from the detection unit 24 is converted from an analog signal into a digital signal via an A/D conversion unit 26, and is then sent to a data processing unit 27.

The processing unit 3 performs almost all operation processes of the electronic apparatus 1, and includes an input interface unit 31, which receives output data from an output interface unit 28 provided in the input device 2. The processing unit 3 includes a data processing unit 32, which processes absolute coordinates data from the input device 2. The processing unit 3 includes also includes a main control unit 33, which controls all operations of the electronic apparatus 1, and a thin display unit 34, such as a liquid crystal display panel.

The data processing unit 27 provided in the input device 2 performs operations, such as the processing of the operation signal when the input unit 21 is operated, and the updating of the reference value. The data processing unit 27 serves as a control unit. However, the updating of the reference value may be performed in the data processing unit 32 or in the main control unit 33 provided in the processing unit 3. Alternatively, the date processing unit 32 or the main control unit 33 may serve as the control unit in the invention.

FIG. 2 shows the input unit 21 in detail. The input unit 21 includes a substrate 41 having a predetermined size. The substrate 41 is made of an insulating material having a predetermined dielectric constant. In this embodiment, the substrate 41 is made of flexible resin sheet (resin film substrate) and the resin material is an organic resin material, such as polyimide or PET (polyethylene terephthalate). However, in the invention, the substrate may be a hard substrate, such as a phenol substrate, or a glass epoxy substrate.

As shown in FIG. 2, a plurality of X electrodes X1, X2, X3, X4, X5, and X6 extend linearly in a Y direction and are parallel to each other, and have a predetermined pitch in an X direction. The X electrodes are formed on one surface (front face in the figure) of the substrate 41. A plurality of Y electrodes Y1, Y2, Y3, Y4, Y5, Y6, Y7, and Y8 extend linearly in the X direction and are parallel to each other, and have a predetermined pitch in the Y direction. The Y electrodes are formed on the other surface (inner face in the figure) of the substrate. A plurality of detection electrodes S1 are formed on one surface of the substrate 41 on which the X electrodes are formed. The detection electrodes S1 extend linearly in the Y direction and are parallel to each other, and have a predetermined pitch in the X direction. Each of the detection electrodes S1 is positioned between neighboring X electrodes. The plurality of detection electrodes S1 are connected to each other and are merged into a common output line Sa, and provided to the output unit 24.

The X electrodes and Y electrodes are insulated from each other with the substrate 41 interposed therebetween. The X electrodes and the detection electrodes S1 are insulated from each other, and the Y electrodes and the detection electrodes S1 are similarly insulated from each other. The detection electrodes S1 may be formed between the Y electrodes on the other surface of the substrate 41.

The X electrodes, the Y electrodes, and the detection electrodes S1 are made of a low-resistance conductive material such as silver and copper. Alternatively, each of electrodes may be made of a transparent electrode material such as ITO. By using this transparent electrode material, a display can be formed on a base portion of the input unit 21. The surface (front surface in the figure) of the input unit 21 is covered with a cover. This cover is made of a nonconductive material, such as a thin synthetic resin plate. Alternatively, a part of a chassis may be made of a synthetic resin constituting various kings of electronic apparatuses, such as a portable terminal, for example, a portable telephone may be used as the cover.

In the input unit 21, a predetermined capacitance is formed between the X electrode and the detection electrode S1, and a predetermined capacitance is formed between the Y electrode and the detection electrode S1. When a operator's finger contacts the cover covering the input unit 21, the finger, which is conductive, approaches or gets close to a certain portion relative to the substrate 41. In this portion, since a capacitance is formed between the finger and the X electrode or between the finger and the Y electrode, the electrostatic field between the X electrode and the detection electrode S1, and the electrostatic field between the Y electrode and the detection electrode S1, vary as the operator's finger changes position. As a result, in the portion closer to the finger, the electrostatic capacitance between the X electrode and the detection electrode S1 decreases, and the electrostatic capacitance between the Y electrode and the detection electrode S1 decreases.

In the input device 2, the X electrodes X1, X2, X3, X4, X5, and X6 are sequentially selected by the X driver 22, and are supplied with a predetermined potential. The Y electrodes Y1, Y2, Y3, Y4, Y5, Y6, Y7, and Y8 are sequentially selected by the Y driver 23, and are supplied with a predetermined potential. The X electrodes and Y electrodes are selected at a different point in time, and the potential is not simultaneously applied on any one of the X electrodes and Y electrodes. A timing selection of X electrodes by the X driver 22 and a timing selection of Y electrodes by the Y driver 23 care controlled by the data processing unit 27. The potential applied on the X electrode and the Y electrode is generated by a power supply circuit 25.

A potential of the detection electrode S1 when a certain X electrode and a certain Y electrode are selected is supplied to the detection unit 24, and the detection output detected in the detection unit 24 is converted into a digital value in the A/D conversion unit 26, and sent to the data processing unit 27. The data processing unit 27 specifies a portion on the X coordinate to which the finger approaches on the basis of the switching timing for indicating that whether a certain X electrode is selected and the detection output obtained form the detection unit 24. The data processing unit 27 also specifies a portion on the X coordinate to which the finger approaches on the basis of the switching timing for indicating that whether a certain Y electrode is selected and the detection output obtained from the detection unit 24.

FIGS. 5A and 5B illustrate an a detection principle for specifying the portion close to the finger in the data processing unit 27. In the input unit 21, when the selected X electrode is supplied with the potential, the unselected X electrode is at ground potential. With respect to the capacitance between the selected X electrode and the detection electrode S1, a potential difference between the X electrode supplied with the potential and the detection electrode S1, slowly increases by a predetermined constant time. In this case, when the finger (which conducts) approaches the X electrode supplied with the potential, a capacitance is formed between the finger and the X electrode. Therefore, the electrostatic capacitance between the X electrode supplied with the potential, and the detection electrode s1, decreases so that the variation in the increase of the potential difference between the X electrode and the detection electrode S1 decreases.

FIG. 5A illustrates at time T0, application of the potential on the X electrode. FIG. 5B illustrates a variation in the potential difference between the X electrode and the detection electrode S1. For example, the variation in the potential difference when the finger is not getting close to the X electrode is shown as (i), while the variation in the potential difference when the finger is getting close to the X electrode is shown as (ii). The potential difference between the X electrode and the detection electrode S1 at a time T1 immediately after the potential is applied on the X electrode, is obtained as the detection value by the data processing unit 27.

An interval between the X electrodes is set narrower than a contacting area when the finger contacts the cover. The X electrodes are sequentially selected and supplied with the potential, and the data processing unit 27 obtains the detection value at (FIG. 5B). Next the detection value is compared with the reference value set for every X electrodes, and the difference between the detection value and the reference value with neighboring X electrodes is compared to specify or estimate the X coordinate position of the portion where the finger makes contact.

Such operations are performed in the same manner as described above when the Y electrodes are sequentially selected and supplied with the potential. The data processing unit 27 monitors the detection output from the detection unit 24 on the basis of the selection information of the X electrodes and the Y electrodes such to specify or estimate the operational portion on the X-Y coordinates of the operator's finger.

As shown in FIG. 5B, the difference between the variation in the detection value (i) when the finger is not approaching the X electrode, and the variation in the detection value (ii) when the finger is approaching the X electrode, is not noticeable. Therefore, the data processing unit 27 sets and stores the reference value for all X electrodes and Y electrodes.

The data processing unit 27 stores a predetermined detection range $\Delta h$. When a certain electrode is selected, the detection value of the potential difference at time T1 shown in FIG. 5B is obtained, and if the difference between the detection value and the reference value is less than or equal to the predetermined detection range $\Delta h$, the operator's finger is determined not to be approaching the electrode. When the difference between the detection value and the reference value is greater than or equal to the predetermined detection range $\Delta h$, the operator's finger is determined to be approaching the electrode. After that, a magnitude of the detection values of the neighboring electrodes are compared such to specify or estimate the position of the coordinates where the finger approaches.

In such kinds of the electrostatic capacitance type input unit 21, since a substantial capacitance between electrodes varies subtly due to the changes in the surround environment or the variation in the floating capacitance, the data processing unit 27 performs a correction of the updating of the reference value for every X electrode and Y electrode. For example, in the correction, when the operation is performed by the finger so that the deference between the detection value and the reference value is greater than or equal to the predetermined detection range $\Delta h$, and the operator's finger move away so that the deference between the detection value and the reference value is less than or equal to the predetermined detection range $\Delta h$, the detection value obtained at this time is updated as the reference value, or the reference value is updated as the value close to the detection value.

Through this correction process, when the finger gets close, the difference between the detection value and the reference value can be detected with high sensitivity. When the finger is not in contact with the cover, but the difference between the detection value and the reference value is greater than the predetermined detection range $\Delta h$, the data processing unit 27 recognized such a state, for example, where a certain portion of the input unit 21 is operated by the finger. As a result, an erroneous operation occurs in which the device is not accurately operated by the finger, but an display image of the display unit 34 is switched, or the main control unit 33 recognizes that a certain operation is performed, so that it starts to execute a process of a predetermined program. Such the erroneous operation cannot accommodate the correction in which the reference value is updated when it is recognized that the finger moves away.

The erroneous operation, in which the finger does not contact the cover but a data process performed, may occur for example, when the substrate 41 of the input unit 21 is expanded and contracted or is deformed due to the drastic temperature change, or when the substrate 41 is deformed due to an external force. When the substrate 41 is expanded and contracted, or is deformed, a distance between the X electrode and the detection electrode S1 and a distance between the Y electrode and the detection electrode S1 are locally changed, and the capacitance between electrodes changes. Therefore, even though the finger is not in contact, the detection value varies. Alternatively, when the cover of the substrate 41 is deformed due to heat or the like, or a conductive material having a large dimension gets close to the input unit 21, the electrostatic capacitance between electrodes varies as well so that the erroneous operation may occur.

Therefore, the data processing unit 27 performs the correction as described in FIG. 3. In FIG. 3, each step of the flow chart is indicated by 'ST'. In addition, FIG. 4 conceptually shows the correction.

In ST1 shown in FIG. 3, the system monitors whether the difference between the detection value at the time of selecting one electrode, and the reference value set for that electrode is greater than or equal to the predetermined detection range $\Delta h$. That is, the data processing unit 27 monitors whether a certain coordinate position has achieved the detection state.

In ST1, when the difference between the detection value at the time of selecting a certain electrode and the reference value set for that electrode is greater that or equal to the predetermined detection range $\Delta h$, and a certain coordinate position has achieved the detection state, ST2 is performed. In ST2, the difference between the detection value and the reference value is detected for a predetermined monitoring time Ta. In FIG. 4B, the detection value for each monitoring time Ta is sown as a pulse, and the reference value set for the electrode at the corresponding time is indicated by LB1. In addition, the difference between the detection value and the reference value LB1 is indicated by $\Delta V1$.

In step ST3, the system monitors whether the coordinate position of the detection state for the detection time Ta has changed. When the coordinate position detection before the monitoring time Ta and the coordinate position currently detected have not changed, step ST4 is performed. When the coordinate position detected before the monitoring time Ta and the coordinate position currently detected are changed, ST7 is performed, and it is determined that the finger actually contacts the cover to operate the device, so that ST8 is performed. The coordinates data of the operated portion is sent to the data processing unit 32 of the processing unit 3 via the interface unit 28. In the main control unit 33 of the processing unit 3, the operation performed when the device is operated by the finger is executed.

In ST3, when the coordinate position of the detection state is not different from the coordinate position before the detection, ST4 is performed so that it is determined whether a number of the detection state of the same coordinate position is greater than N, that is, whether a number of the detection state of the same coordinate exceeds a period of detention time Ta. For example, when the detection time Ta if 10 ms and N is set as 100, it is determined in ST4 whether the detection state at the same coordinate position occurs for 1 second. The N may be dozen or hundreds.

When it is determined that the number of the detection state of the same coordinate position is greater than N, ST5 is performed so that it is determined whether the difference $\Delta V1$ between the detection value and the reference value LB1 of N times more of detection state is greater than or equal to the update detection range $\Delta H$. The updated detection range $\Delta H$ is then stored in the data processing unit 27 as an final value suitable for the characteristic of the input unit 21, and the updated detection range $\Delta H$ is set slightly greater than the predetermined detection range $\Delta h$.

At a point of time where N times more of the detection are performed, when it is determined that the difference $\Delta V1$ between the detection value and the reference value LB1 is less than the updated detection range $\Delta H$, and ST6 is performed. In ST6, the reference value LB1 of the electrode, which is detected when the difference between the detection value and the reference value LB1 is greater than the predetermined detection range Δh, is updated to the reference value LB2, which corresponds with the detection value at the corresponding time.

When the reference value is updated to LB2, the difference between the detection value and the reference value LB2 after the updating becomes almost zero. Therefore, the erroneous operation in which a certain coordinate position is continuously detected, is resolved. After that, the electrode is used to compare the reference value LB2 after the updating with the detection value. As shown in a rightmost side of FIG. 4B, when the device is actually operated by the finger, and the difference ΔV2 between the detection value and the reference value LB2 is greater than the predetermined detection range Δh, it can be determined that the finger approaches the electrode.

In ST5, when the difference ΔV1 between the detection value and the reference value LB1 at N times more of the detection is greater than or equal to the updated detection range ΔH, ST7 is performed. When it is determined that the device is actually operated by the finger in ST7, ST8 is performed.

In addition, in ST5, when the difference between the detection value and the reference value LB1 at N times more of the detection is not greater than the updated detection range ΔH, the reference value is updated from LB1 to LB2. However, the reference value may be updated from LB1 to LB2 when the difference between the detection value and the reference value LB1 is not greater than the updated reference value ΔH by a predetermined amount or more during N times of detection.

In the operation shown in FIG. 3, when the output for detecting the same coordinate position from the input unit 21 is continued and the output is in a range of the updated detection range ΔH, or below the update detection range ΔH for a predetermined period, the erroneous operation is determined. Actually, when the finger sets close to the input unit 21 (makes contact with the cover) to operate the device, the detection state of the same coordinate position is hardly continued, and the low detection value is hardly maintained. Therefore, by performing such processes, the erroneous operation in which the device is not operated by the finger but the same coordinate state is continuously detected, can be prevented.

When the device is actually operated by the finger but the detection state of the same coordinate position is continued due to the operation, and the difference between the detection value and the reference value is not greater than or less than the detection range ΔH, the reference value may be updated to LB2 even though the device is operated by the finger. In order to prevent such an occurrence, when the difference between the detection value and the reference value is less than or not greater than the predetermined detection range Δh (this case is generated when the device is actually operated by the finger and the finer gets away), the correction of the detection thereafter is also performed to correspond to the reference value. By performing the correction, even when the finger is in contact but the reference value is updated from LB1 to LB2, the reference value can be restored as the final value at a point of time when the finger moves away.

In the electronic apparatus shown in FIG. 1, the absolute coordinate data from the data processing unit 27, which indicates the position on the X-Y coordinates of the operation portion where the input unit 21 is operated by the finger, is generated and then supplied to the processing unit 3, the main control unit 33 of the processing unit 3 performs a predetermined program on the basis of the absolute coordinates data, or allows the display unit 34 to perform a predetermined operation. In addition, in the data processing unit 27 or the data processing unit 32, the absolute coordinate data obtained by the input unit 21 may be converted into relative coordinate data, which indicates a direction and a distance of a movement of an operation position, and the main control unit 33 may perform a predetermined program on the basis of the relative coordinate data and allow the display unit 34 to perform a display operation.

The terms and descriptions used herein are set forth by way of illustration only and are not meant as limitations. Those skilled in the art will recognize that many variations can be made to the details of the above-described embodiments without departing from the underlying principles of the invention. The scope of the intention should therefore be determined by the following claims (and their equivalents) in which all terms are to be understood in their broadest reasonable sense unless otherwise indicated.

The invention claimed is:

1. An input device comprising:
   an input unit having a plurality of electrodes intersecting each other, the respective electrodes being insulated from each other;
   a driver configured to select one electrode and apply a potential thereto; and
   a control unit configured to acquire a detection value based on a variation in an electrostatic field between the electrodes, and determine if a detection state for detecting a certain coordinate position of the input unit is achieved on the basis of a difference between the detection value and a reference value,
   wherein the control unit updates the reference value when the detection state for detecting the same coordinate position is continued and when it is determined that the difference between the detection value and the reference value is less than or equal to a predetermined updated detection range; and
   wherein the control unit monitors the detection value every predetermined monitoring time when the detection state has been achieved, and compares the difference between the detection value and the reference value with the predetermined updated detection range when it is determined that the detection state for detecting the same coordinate position is continued for a predetermined number of monitoring times.

2. The input device according to claim 1, wherein the reference value is updated to have the same value as the detection value.

3. The input device according to claim 1, wherein the control unit stores a predetermined detection range and determines that the detection state is achieved, when it is determined that the difference between the detection value and the reference value is greater than or equal to the predetermined detection range.

4. The input device according to claim 1, wherein the control unit determines if the operator is approaching the input unit and generates coordinates data on the basis of the detection value when judging that the difference between the detection value and the reference value is equal to or greater than the predetermined update detection range.

5. The input device according to claim 1, wherein the reference value is set for each electrode supplied with the potential.

6. The input device according to claim 1, wherein the input unit further includes
   a plurality of X electrodes and Y electrodes, which are insulated from each other and intersect each other;

detection electrodes positioned between adjacent X electrodes or between adjacent Y electrodes;

an X driver configured to sequentially select and apply a potential to the X electrodes;

a Y driver configured to sequentially select and apply a potential to the Y electrodes; and wherein the detection unit detects a potential difference between the X electrode supplied and the corresponding detection electrode or a potential difference between the Y electrode and the corresponding detection electrode.

7. The input device according to claim 6, wherein the X electrodes are formed on a first surface of a substrate made of a resin sheet, the Y electrodes are formed on a second surface of the substrate, and the detection electrodes are formed on the first or the second surface of the substrate.

\* \* \* \* \*